(12) United States Patent
Vance

(10) Patent No.: US 6,389,302 B1
(45) Date of Patent: May 14, 2002

(54) METHODS AND APPARATUS FOR CAUSING WIRELESS COMMUNICATION DEVICES TO VIBRATE VIA PIEZO-CERAMIC VIBRATORS

(75) Inventor: Scott L. Vance, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/301,218

(22) Filed: Apr. 28, 1999

(51) Int. Cl.[7] .................................................. H04B 1/38
(52) U.S. Cl. ......................... 455/567; 455/575; 455/90
(58) Field of Search .......................... 455/90, 575, 557, 455/571, 572, 573, 550, 567; 340/211.1, 825.56, 407, 407.1, 407.2, 7.6

(56) References Cited

U.S. PATENT DOCUMENTS

| | | | | |
|---|---|---|---|---|
| 3,618,070 A | | 11/1971 | Kagan ........................ 340/311 |
| 3,623,064 A | | 11/1971 | Kagan ........................ 340/311 |
| 4,057,794 A | * | 11/1977 | Groossfield ................. 340/311 |
| 4,786,889 A | * | 11/1988 | Hayasaka .................... 455/90 |
| 5,023,504 A | * | 6/1991 | Mooney et al. ......... 340/825.44 |
| 5,181,023 A | | 1/1993 | Fujii .......................... 340/825 |
| 5,229,744 A | * | 7/1993 | Ogura ........................ 340/407 |
| 5,270,702 A | * | 12/1993 | Krolak .................. 340/825.44 |
| 5,488,351 A | | 1/1996 | Hedayatnia et al. ..... 340/407.1 |
| 5,551,079 A | * | 8/1996 | Panther et al. .............. 455/347 |
| 5,657,205 A | | 8/1997 | Tamaru et al. .............. 361/761 |
| 5,729,589 A | * | 3/1998 | Samson ...................... 455/567 |
| 5,898,364 A | | 4/1999 | Gotou ..................... 340/407.1 |
| 6,011,699 A | * | 1/2000 | Murray et al. .............. 455/575 |
| 6,111,760 A | * | 8/2000 | Nixon ......................... 455/90 |
| 6,151,486 A | * | 11/2000 | Holshouser et al. .......... 455/90 |

OTHER PUBLICATIONS

Walker et al; Battery Door Vibrator, Motorola Technical Developments, vol. 20, Oct. 1, 1993 pp 158–160.
Mueller et al; Battery Door Vibrator, Motorola Technical Developments, vol. 22, Jun. 1, 1994 pp 118–120.
PCT International Search Report for Int. Appl. No. PCT/US00/08970 filed May 4, 2000.

\* cited by examiner

*Primary Examiner*—William Trost
*Assistant Examiner*—Tilahun Gesesse
(74) *Attorney, Agent, or Firm*—Myers Bigel Sibley & Sajovec, P.A.

(57) ABSTRACT

A miniaturized piezo-ceramic member is positioned in a radiotelephone or wireless communication device to relatively rapidly deflect in a first direction and a second direction. The piezo-ceramic member contacts and forces a component of the radiotelephone or device having a sufficient mass to translate in the first and second direction in response to the deflection or movement of the piezo-ceramic member thereby generating a vibrating or shaking motion for the radiotelephone or device which is detectable by a user. In a preferred embodiment the component is a battery having a mass which is at least about 10% the mass of the device or radiotelelphone.

32 Claims, 14 Drawing Sheets

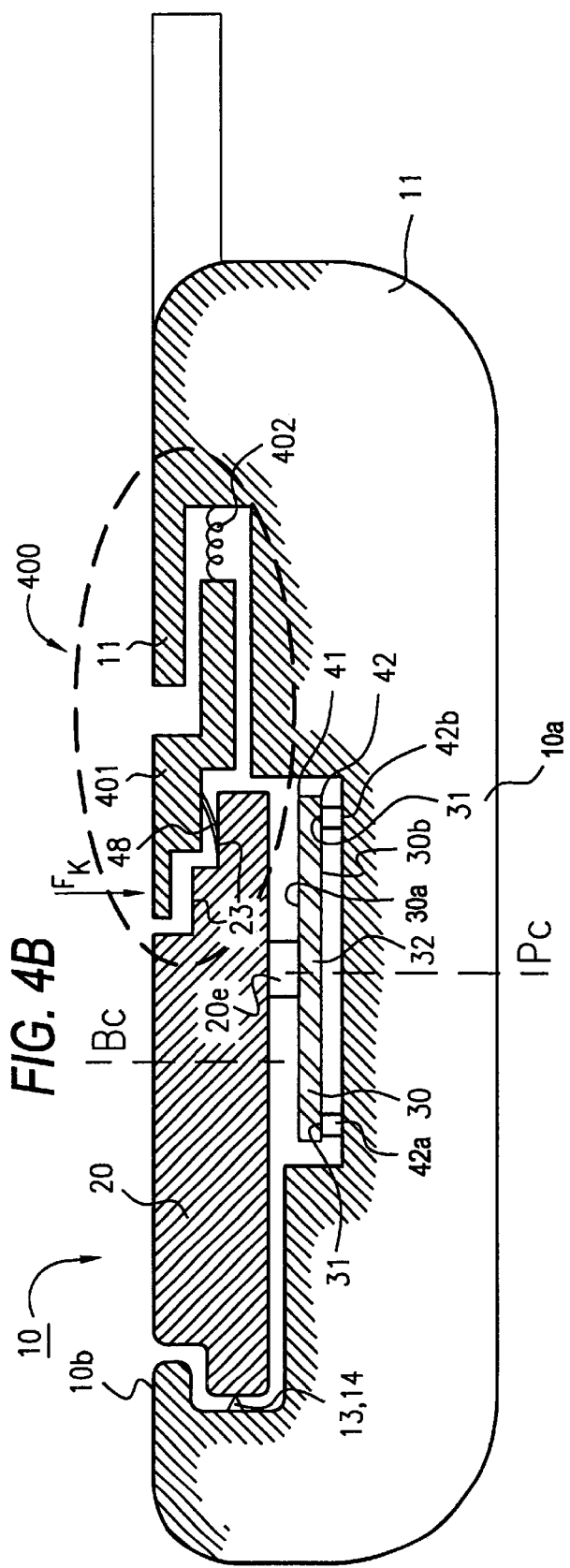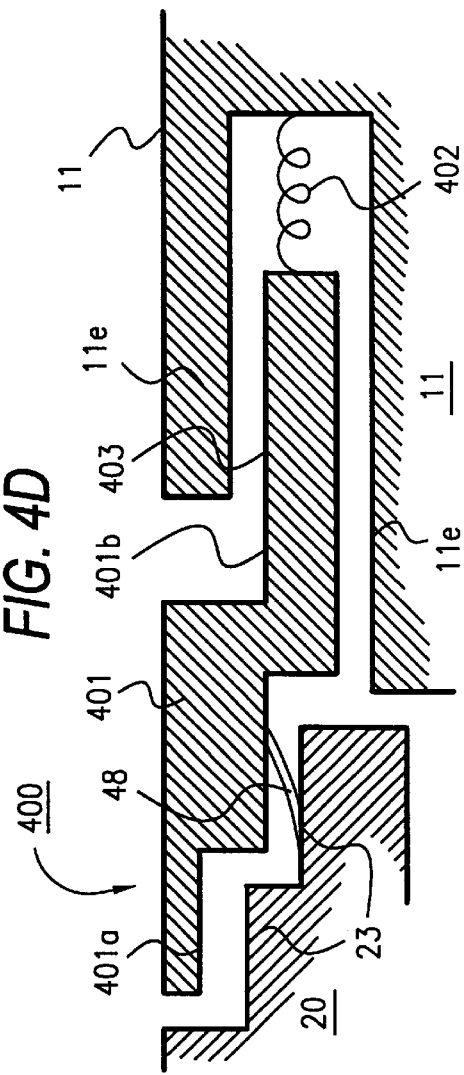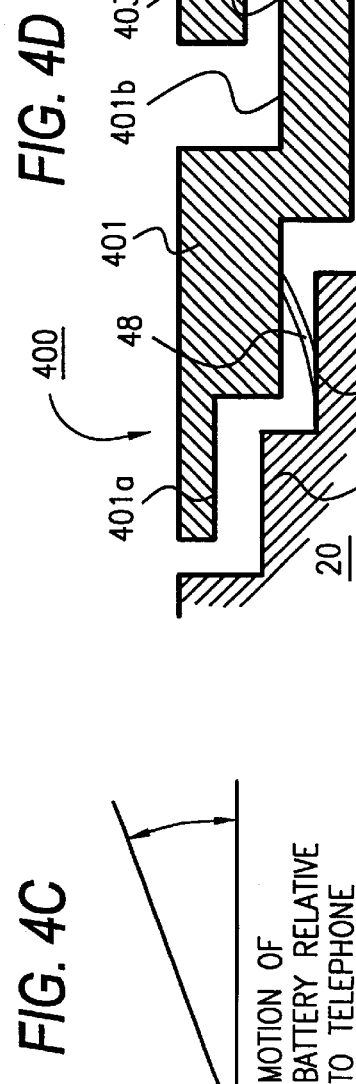
FIG. 4B
FIG. 4C
FIG. 4D

TOTAL DISPLACEMENT = $2x$ $f = f_0$

TOTAL DISPLACEMENT = X $f = 2f_0$

DEFLECTION OF CANTILEVER PIEZOMEMBER (FREE DISPLACEMENT)

S/N 3 (SERIES, Ni)
6523NS – 075250
V = ± 200V
$X_f$ = ± .0035"

CLAMPED AT END WITH BLOCKED FORCE

V = 200V
$F_b$ = 34g

CAP = 4.6nf

* CANTILEVER LENGTH = Ø .50"

DRIVING WAVEFORM
DISPLACEMENT OF
"A" RELATIVE TO "B"

DISPLACEMENT OF "C"
RELATIVE TO "D"

$(f = 1/T)$

DISPLACEMENT $\Longrightarrow 2x \longrightarrow x$

TIME $\Longrightarrow T_2 \longrightarrow T_1/2$

"FREQUENCY" $\Longrightarrow f_2 \longrightarrow 2f_1$

METHODS AND APPARATUS FOR CAUSING WIRELESS COMMUNICATION DEVICES TO VIBRATE VIA PIEZO-CERAMIC VIBRATORS

FIELD OF THE INVENTION

The present invention relates generally to vibrator units for wireless communication devices such as radiotelephones.

BACKGROUND OF THE INVENTION

Today, many wireless devices such as cellular telephones or radiotelephones are small, compact, and portable. Some of these radiotelephones are described as "pocket" telephones because they are small enough to fit in the pocket of a user. Unfortunately, as the size of the radiotelephones continues to shrink, the efficient use of space, the numbers and size of components, and the weight of the components can become important design considerations.

Some radiotelephones can operate in a vibrating mode to act as a substantially silent alarm or pager to alert the user. As such, when positioned to contact a user, the vibrating motion can alert the user of a meeting reminder time, an incoming call and the like. The radiotelephone has conventionally provided the vibrator mode by various means. For example, some radiotelephones employ a motor to turn an eccentric weight positioned in the end of the telephone. Other radiotelephones have used a vibration motor which uses centrifugal force to generate vibration. One type of vibration motor is a flat pancake-like motor such as that proposed by U.S. Pat. No. 5,036,239. Another type of vibration motor is a cylindrical motor with a built-in eccentric weight such as that shown in U.S. Pat. No. 5,107,155. Generally described, vibration motors rotate to provide an off-balance distribution of weight and, therefore, a vibrating or even "buzzing" output for the radiotelephone. Unfortunately, these vibrator configurations can be relatively costly due to the number of windings in the motor.

In addition, in the past, the amount of vibration output by the device was typically limited to adjustments to the input frequency, vibrator mass, or displacement of the mass. Increasing the frequency can sometimes cause the vibrating sensation to undesirably produce a sound so as to resemble a buzzing sensation. Increasing the vibrator mass can add weight to radiotelephone which can make it more difficult for the motor to drive, decrease the life of the motor, or increase the size of the motor needed, while increasing the displacement can require the use of additional operational space in a limited space compact design.

There is therefore a need to provide a cost-effective and reliable vibrating unit which can be used with compact radiotelephone designs.

OBJECTS AND SUMMARY OF THE INVENTION

In view of the above, it is an object of the present invention to provide a cost effective vibrator for a compact radiotelephone.

It is another object of the present invention to minimize the number of separate assembly components employed to vibrate the radiotelephone.

It is an additional object of the present invention to provide a relatively non-complex vibrator configuration which includes no rotating eccentric vibrating mass or motor.

These and other objects of the present invention are provided by a miniaturized piezo-ceramic vibratory unit which is configured to vibrate a mass which is a pre-existing component integral to the device. In a first aspect of the invention, a radiotelephone comprises a radiotelephone housing and a battery resiliently mounted to the radiotelephone housing such that it is free to undergo repetitive movement (preferably oscillatory or reciprocal movement) relative thereto. The radiotelephone also includes a vibrator operably associated with the battery. In operation, the vibrator deflects a first direction and a second substantially opposite direction (such as toward and away from the battery) and the battery undergoes repetitive movement relative to the radiotelephone housing responsive to the deflection of the vibrator, thereby providing a vibrating sensation for the radiotelephone. In a preferred embodiment, the vibrator is a piezo-ceramic vibrator. It is also preferred that the radiotelephone includes an electroluminescence (EL) display and a single driver is configured to drive both the piezo-ceramic vibrator and the EL display at a frequency of about 200 Hz (piezo-ceramic vibrator is preferably driven at about 30–200 Hz and the EL display at about 200–500 Hz, thus the dual driver drives at a frequency which is suitable for both).

Another aspect of the present invention is a method of providing a substantially silent alert for a radiotelephone (and/or a wireless communication device). The radiotelephone has a flip or cover, a rotational antenna, a clip, and front and back housing members. The method includes mounting a piezo-ceramic member so that at least one end is fixed to a stationary portion of the radiotelephone. The method also includes mounting a selected radiotelephone component to the radiotelephone so that it is free to undergo repetitive movement in response to contact with the piezo-ceramic member and deflecting the piezo-ceramic member from a non-electrically driven position to an electrically driven position. The selected component is contacted by the deflected piezo-ceramic member and the selected component is repeatedly moved or displaced a distance in a first direction and a distance in a second direction (opposite the first direction). The component translation corresponds to the direction of deflection of the piezo-ceramic member. The selected component has a mass which is sufficiently large with respect to the overall mass of the radiotelephone to generate a user detectable vibration due to the translation thereof. Preferably, the selected component is one or more of the flip, cover, clip, antenna, battery, front, and back housing.

Another aspect of the present invention is method of providing a silent alert for a wireless communication device. The method includes providing a wireless communication device with a vibrating unit which includes a deflecting member and energizing the vibrating unit such that the deflecting member deflects and induces vibratory output for the device.

Another aspect of the present invention is a wireless communication device which includes a wireless communication device housing and a selected or assembly component resiliently mounted to the wireless communication device housing such that it is free to undergo repetitive (preferably reciprocal or oscillatory) movement relative thereto. The device also includes a vibrator operably associated with the selected assembly component. In operation, the vibrator rapidly deflects in a first direction and a second direction substantially opposite the first direction, and the selected assembly component repeatedly moves relative to the wireless communication device housing responsive to the deflection of the vibrator, thereby providing a vibrating sensation for the wireless communication device. Preferably the vibrator is a piezo-ceramic member which is configured as a flat blade like member which is mounted to the housing such that it extends either substantially perpendicular to or parallel to the direction of translation of the selected component. It is also preferred that the selected component is one or more of internally or externally mounted assembly components such as a flip, an antenna, a clip, front housing, back housing, battery, and printed circuit board.

BRIEF DESCRIPTION OF THE DRAWINGS

The accompanying drawings, which are incorporated in and constitute a part of the specification, illustrate an embodiment of the invention and, together with the description, serve to explain principles of the invention.

FIG. 4B is a side section view of an alternate mounting configuration for a battery and piezo-ceramic vibrator according to the present invention.

FIG. 4C is a schematic illustration of the vibratory motion of the battery relative to the radiotelephone mounted as shown in FIG. 4B.

FIG. 4D is an enlarged partial fragmentary view of the spring-loaded battery latch shown in FIG. 4B.

As shown in FIG. 6B, during operation the piezo-ceramic member is mounted to have a center and two end contacts, and to deflect a distance "x". Similarly, as shown in FIG. 6D, the piezo-ceramic member deflects (in the other direction) a distance "x". Thus, the moveable member can be displaced a distance "x" in each direction for a total displacement of "2x" for a frequency ($f=f_0$).

FIGS. 8A and 8C illustrate the non-driven position while FIGS. 8B and 8D illustrate the deflection of the piezo-ceramic elements in response to the input from an electrical driver circuit.

FIG. 18B graphically illustrates the amplitude of the driving waveform over time (distance "x" vs. time "t") for a displacement of point A relative to point B on the piezo-ceramic member. FIG. 18C graphically illustrates the displacement of point C relative to point D. As shown in FIG. 18C, the response period $T_2$ is about half of the value of $T_1$ and the frequency $f_2$ ($1/T_1$) is $2f_1$. Thus, as shown, the displacement of the mass (point C) is "x" versus a driving wave displacement of 2x (point A relative to point B).

DETAILED DESCRIPTION OF PREFERRED EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, layers or regions may be exaggerated for clarity.

Figure 1:
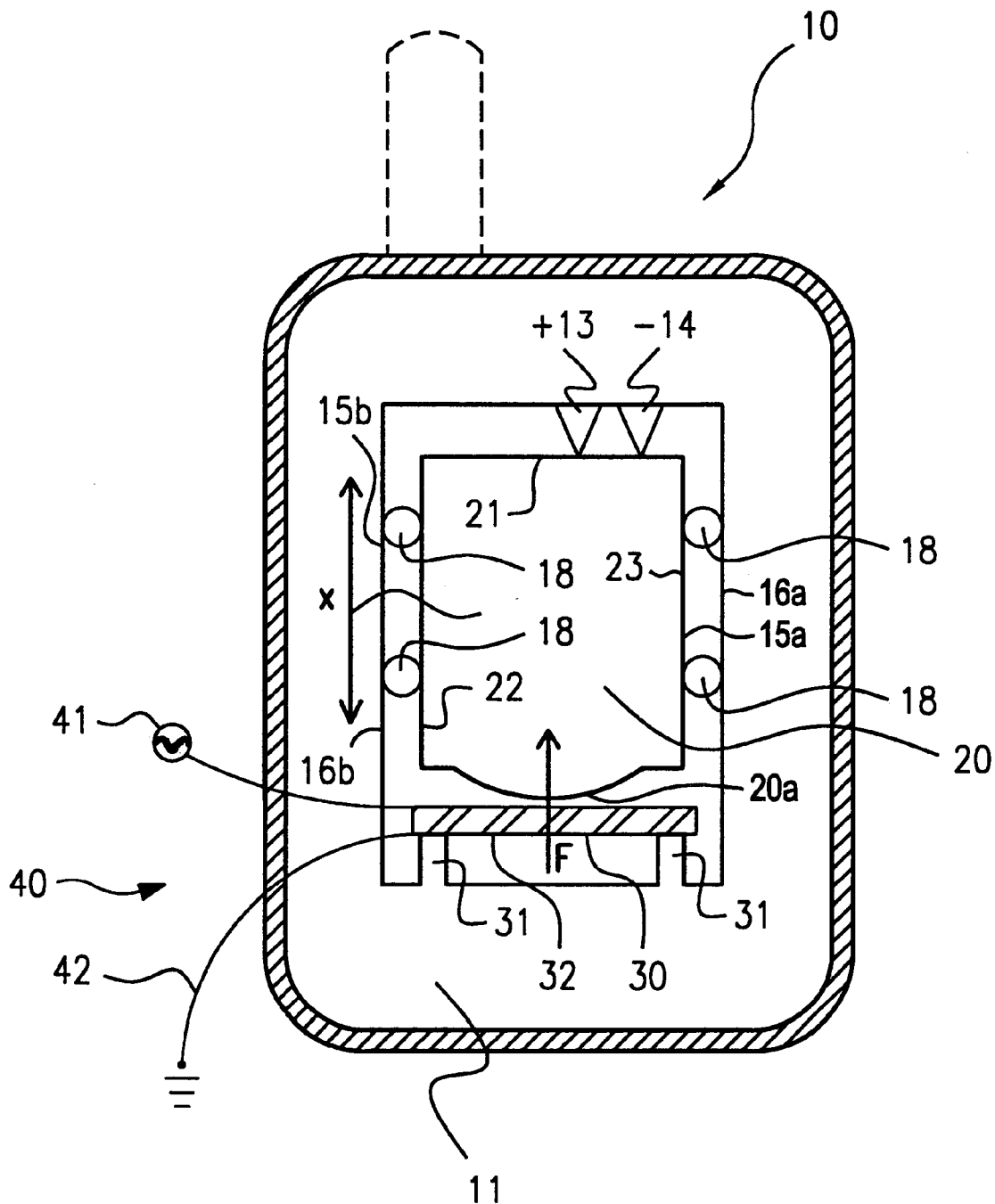
FIG. 1 is a schematic illustration of a top view of a radiotelephone with a vibrator unit according to the present invention.

FIG. 1 illustrates a preferred embodiment of the present invention. As shown, the radiotelephone 10 includes a battery 20 and a piezo-ceramic member 30. The piezo-ceramic member 30 is mounted to the radiotelephone housing 11 and is positioned to contact one end of the battery 20a.

Figure 6A:
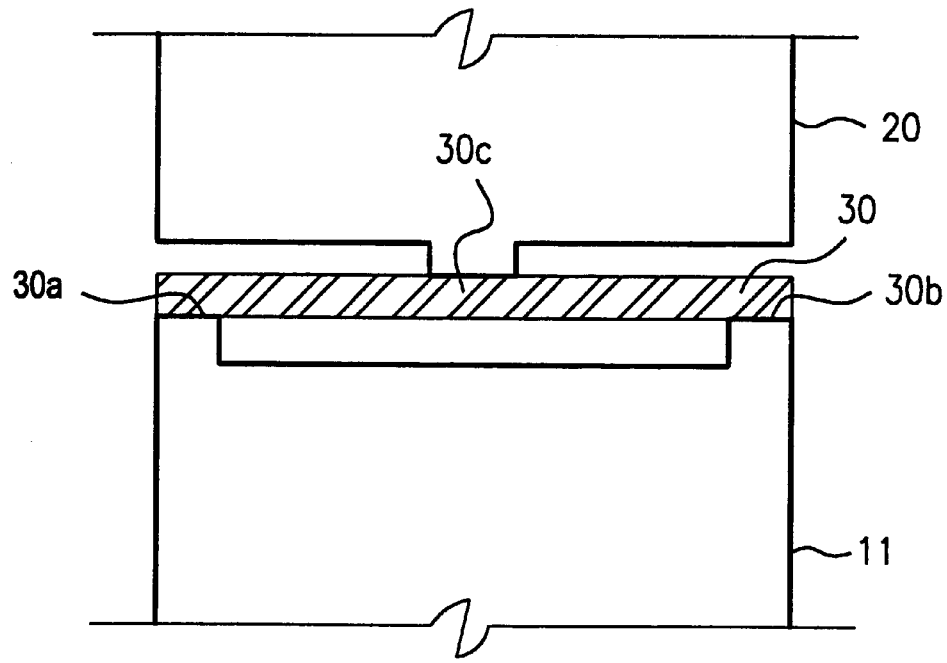
FIGS. 6A, 6B, 6C, and 6D are schematic illustrations of a single layer piezo-ceramic element configured to increase bending displacement.
Figure 6B:
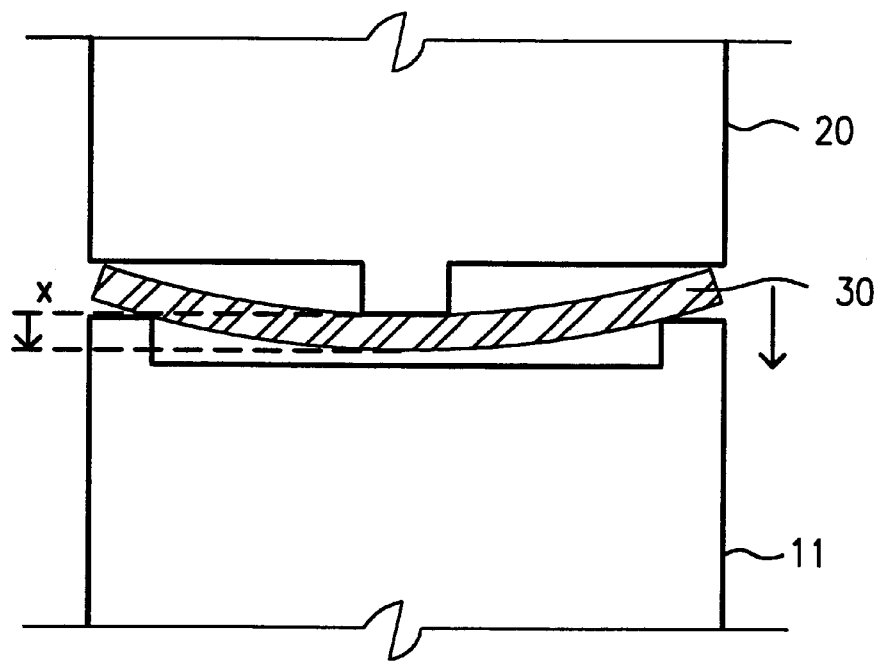
Figure 6C:
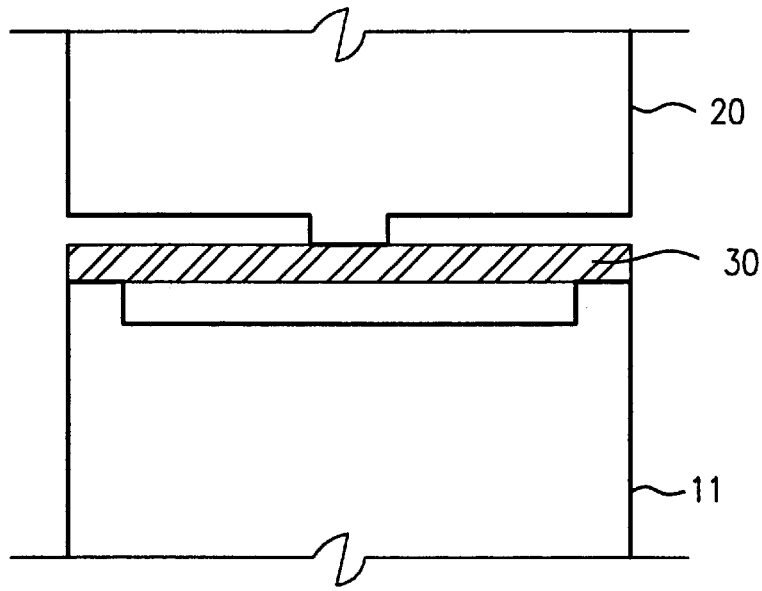

In operation, an intermediate or central portion of the piezo-ceramic member 30 deflects or bends in response to an applied voltage. As the piezo-ceramic member 30 deflects in a forward direction (FIG. 6D), it forces the battery 20 forward along a translation or displacement axis "x". Upon release of the voltage, the piezo-ceramic member 30 returns to a static position (the position shown in FIG. 1), or upon applied voltage of opposite polarity, the piezo-ceramic member 30 deflects in the opposite direction (FIG. 6B). In each case, in response to the removal of the deflection force, the battery 20 moves rearward a distance about the "x" translation axis. This forward and rearward translation or displacement of the battery 20 with respect to the (substantially) static housing 11 is repeated a plurality of times in relatively quick or rapid succession thereby generating a vibrating output for the radiotelephone 10.

In comparison to conventional vibrators, this vibrator configuration can provide a suitable level of vibration by translating a larger mass a smaller distance. The battery 20 is typically of sufficient weight relative to the weight of the radiotelephone 10 that a relatively small translation of the battery 20 can provide the motion necessary to generate a user-detectable level of vibration. For example, for a radiotelephone 10 having a mass of about 80 grams, the battery 20 has a mass of at least about 15–20 grams. Preferably, for the instant invention, the battery 20 has a mass which is preferably at least 10% that of the radiotelephone, and more preferably at least about 20%, and still more preferably at least about 25%.

Turning again to FIG. 1, in order for the battery 20 to easily move in response to the deflection generated force of the piezo-ceramic member 30, the front end 21 of the battery is positioned to abut and contact two spring-loaded power circuit contacts 13, 14 (a positive contact 13 and negative contact 14) which extend a distance out of the housing 11. This spring-loaded battery mount configuration provides the electrical connection with the internal radiotelephone circuitry (not shown) while providing the structural resilience to allow the battery 20 to "float" in the direction of the "x" translation axis so that it moves forward and rearward in concert with the repeated forward and rearward deflection of the piezo-ceramic member 30. The spring-loaded contacts can also be provided by alternative floating or resilient contacts such as elastomeric contacts and the like.

Figure 2:
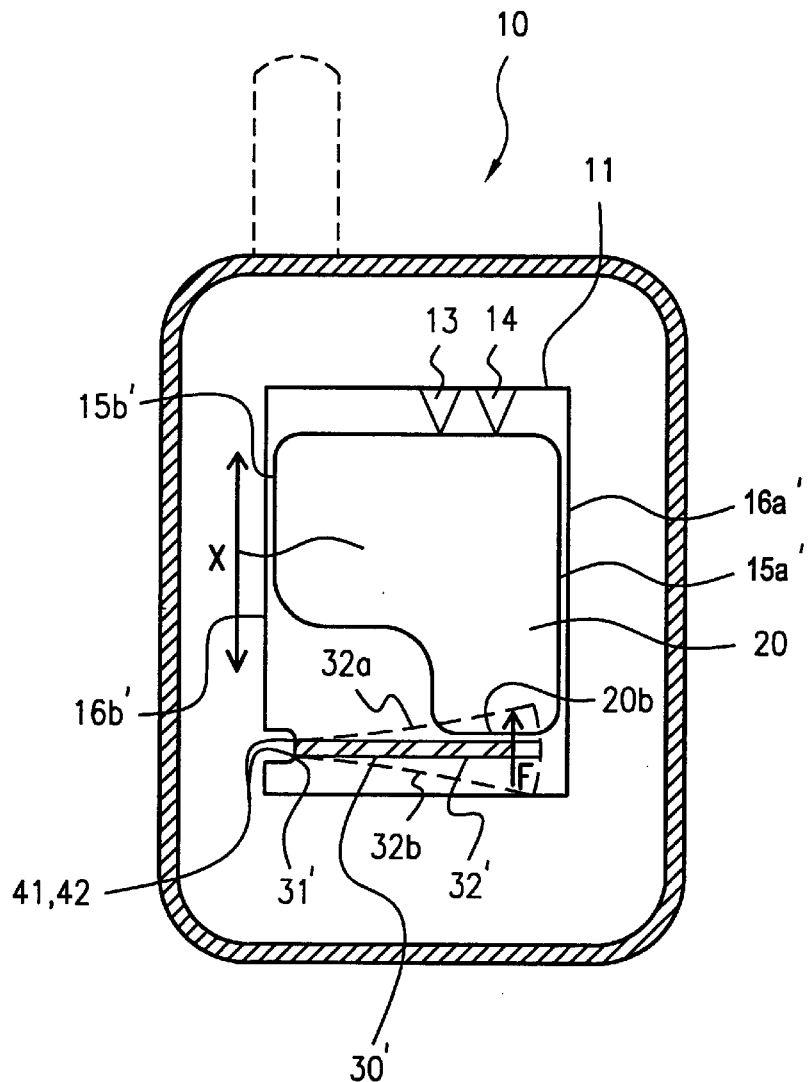
FIG. 2 is a schematic illustration of a top view of an alternate embodiment of the present invention showing an alternate piezo-ceramic and battery mounting arrangement.

As shown, it is also preferred that the housing portion 16a, 16b which contacts the battery sides 22, 23 be configured with roller bearings 18 or a low friction slide surface (not shown) to facilitate easy displacement or translation of the battery 20. Alternatively (or in addition to the rollers 18), as shown in FIG. 2, the sides of the battery 15a', 15b' can themselves be coated or formed with a low friction slide material such as, but not limited to, TEFLON, nylon, lubricated plastics, graphite, metallic plating, and the like. FIG. 2 also illustrates that the battery directly contacts the sides of the housing 16a', 16b'. As such, the housing sides 16a', 16b' forming the battery receptacle and/or the corresponding battery sides 15a', 15b' are preferably coated or formed with a low friction material such as TEFLON, nylon, lubricated plastics, graphite, metallic coatings, and the like.

As is also shown in FIG. 1, the piezo-ceramic member 30 is affixed at both end portions 31 to the housing 11. In this embodiment, the central portion 32 is free to deflect in response to the electrical input. FIG. 1 also shows that the piezo-ceramic member 30 is configured to electrically connect with an operating or driver circuit 40. As schematically shown, the driver circuit includes a driver 41 and a ground 42. The operating circuitry 40 will be discussed further below.

Turning again to FIG. 2, an alternate piezo-ceramic member 30 mounting configuration is shown. In this embodiment, the piezo-ceramic member 30' is secured at one end 31' to the housing 11 to provide a cantilevered mounting configuration. As such, the cantilevered piezo-ceramic member 30' can deflect along a major portion 32' of its length. A free (non-loaded) deflection pattern for this configuration is shown in dotted line. The forward deflection is identified as 32a, and the rearward deflection is identified as 32b. Of course, the actual deflection of the cantilevered piezo-ceramic member 30' is adjusted due to the contact with the battery 20 (the piezo-ceramic member has an end load associated with the contact surface configuration and weight of the battery).

Figure 3:
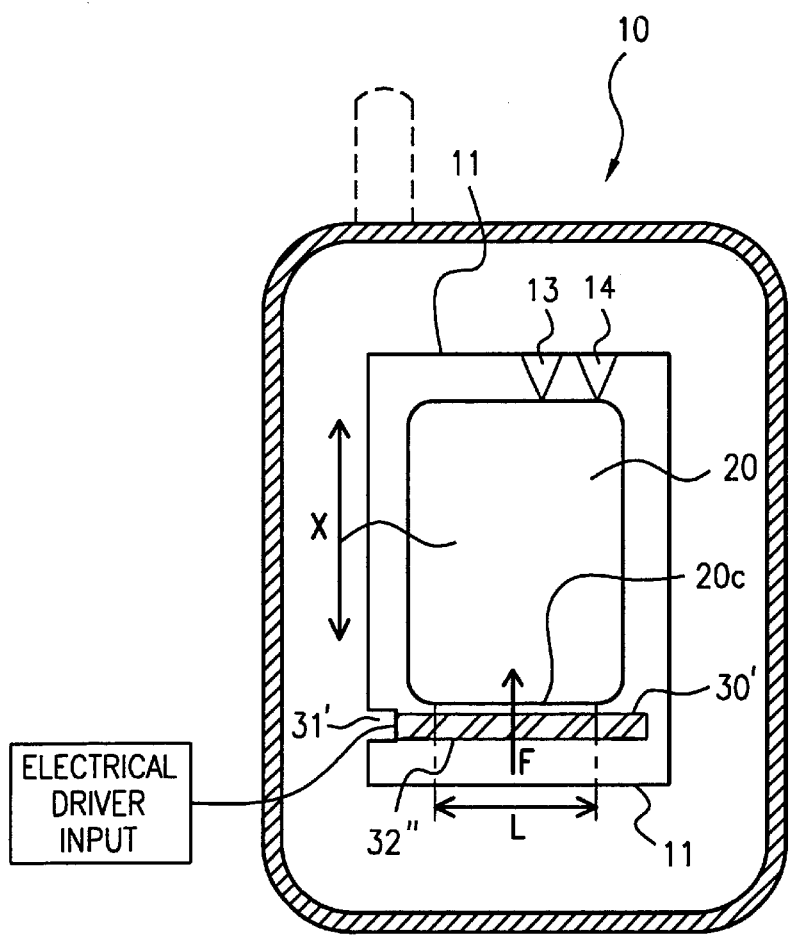
FIG. 3 is a schematic illustration of a top view of yet another embodiment of the present invention showing another alternate piezo-ceramic and battery mounting arrangement whereby a major portion of the length of the piezo-ceramic member contacts a battery or suitably weighted component mass. As shown, the piezo-ceramic member contact length "L" is substantially equal to the length of the corresponding end of the battery.

FIG. 2 also illustrates that the battery 20 has been configured to contact the piezo-ceramic member 30' at an end contact portion 20b. This loading should help provide increased deflection by positioning the battery contact portion 20b at a position of increased deflection potential along the piezo-ceramic member 30'. Of course, other contact configurations can also be employed. For example, FIG. 3 shows the cantilevered piezo-ceramic member 30' configured and positioned to contact the battery 20 along a major portion of the length 32" of the piezo-ceramic member 30.

Figure 4A:
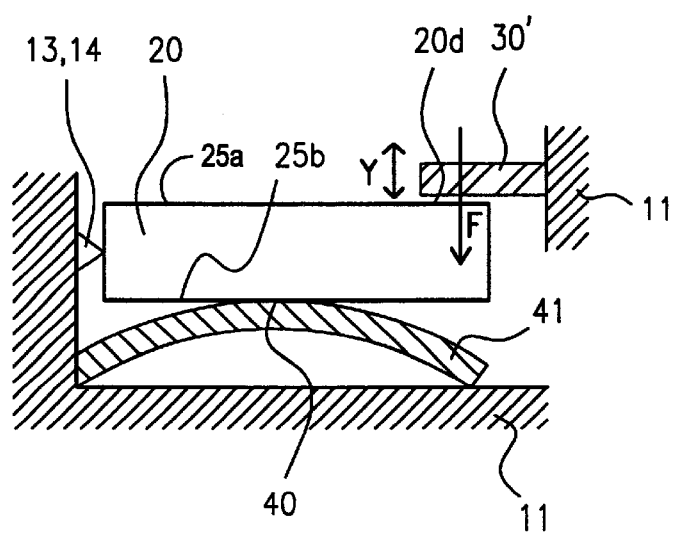
FIG. 4A is a side section view of a mounting configuration for a battery and piezo-ceramic vibrator according to the present invention.

FIG. 4A is a side section view of another vibrator configuration according to the present invention. As shown, the piezo-ceramic member 30' is mounted to the housing 11 such that it extends above or below a major surface 25a, 25b of the battery 20 (the above or below positional description depending on the orientation of the radiotelephone during use). As also shown, the piezo-ceramic member 30' deflection surface is positioned to contact the battery contact surface 20d along a major portion of its length 32. In this configuration, it is preferred that the battery 20 is operably associated with an underlying spring contact surface 40, shown here as a leaf spring 41. This underlying spring contact surface 40 can also be supplied by other resilient surface configurations or components, such as, but not limited to, a plurality of pogo-type springs, coil springs, or materials which have a spring force associated therewith (i.e., elastomeric materials and the like). Accordingly, downward deflection of the piezo-ceramic member 30' pushes the battery 20 downward against the leaf spring 41. Reverse movement or deflection of the piezo-ceramic member 30' then allows the force attributed to the leaf spring 41 to urge the battery 20 upward. Thus, this upward and downward movement provides the repeating translation of the battery mass 20 which generates the vibration for the radiotelephone 10.

Of course, this embodiment can also be reversed, i.e., the position of the spring surface 40 and the piezo-ceramic member 30' can be reversed relative to the battery 20 so that upward deflection of the piezo-ceramic member 30' displaces the battery 20 upward in response to contact force generated therefrom. In any event, the direction of deflection for these embodiments is indicated in FIG. 4 by the arrow noting the "y" direction. In this configuration, the piezo-ceramic member 30' is shown as a cantilevered mounting arrangement, but other mounting arrangements can also be used such as those described herein. For this embodiment, the piezo-ceramic member 30' is preferably configured to be driven by a series driver 30s (FIG. 14), but may also be configured for a parallel driver 30p (FIG. 15) as will be discussed further below.

FIG. 4B illustrates yet another embodiment of the present invention. As shown, the radiotelelphone 10 is oriented such that the user interface 10a (i.e., the input key surface) is facing down and the rear of the radiotelephone 10b is facing up. The piezo-ceramic member 30 is fixed to the housing 11 such the battery 20 overlays and contacts the translating portion of the piezo-ceramic member. Preferably, as shown, the center of the piezo-ceramic member ("$P_c$") is offset from the center of the battery ("$B_c$"). The piezo-ceramic member 30 is configured such that both end portions 31 are affixed to the housing 11. Preferably, pads 20e, 31 are mechanical contact points corresponding to 30a, 30b, and 30c in FIG. 6A. The upper and lower surfaces 30a, 30b form the electric contact surfaces 41, 42 which are in electrical communication with a driver positioned in the radiotelephone housing 11 to drive the piezo-ceramic member 30. The electric contact surfaces 41, 42 can be interconnected with the drive circuit in a number of ways as will be appreciated by those of skill in the art. For example, in one embodiment, electric contact surfaces 41, 42 are configured such that one of the electric surfaces is a ground while the other provides an AC input signal. Alternatively, each of the contact surfaces 41, 42 can be configured to be driven differentially, such as with opposing AC signals.

The internal operating circuitry of the battery 20 is electrically connected to the radiotelephone 10 by spring-loaded contacts 13, 14 (only one battery contact is shown in this view and this contact is shown as a spring pogo-type contact). Preferably, the battery 20 is also held in position in the housing 11 by configuring the battery 20 with a stepped portion 23 which is aligned with a spring-loaded battery latch 400 which holds the battery 20 to the housing 11. A resilient member 48 (such as a spring) is positioned in the stepped portions 23 to resiliently hold the battery 20 and housing 11 in alignment. In operation, the battery 20 moves relative to the telephone housing in the direction shown in FIG. 4C. Thus, in the embodiment shown in FIG. 4B, the intermediate portion of the piezo-ceramic member 32 deflects upwardly against a contact point 20e operably associated with the battery 20. The battery 20 moves upward in response to the deflection of the piezo-ceramic member 30. During this translation, the battery 20 maintains electrical contact with the radiotelephone power contacts through the electrical spring contact(s) 13, 14. The battery 20 is urged upward but is held securely against the top of the housing 11 via the resilient member 48 (and/or other components) and battery latch 400. Upon removal of the upward deflection force, the battery 20 is urged down by the spring force ($F_k$) associated with the resilient member 48 as it is loaded against the housing 11 to bias the battery 20 to return to the non-deflected position.

A suitable battery latch 400 is shown in FIG. 4D. As shown, the battery latch 400 includes a laterally extending stepped arm 401 and a front spring 402. The arm includes two opposing end portions. 401a, 401b. The first end portion 401a is configured to overlay and matably receive the stepped portion of the battery 23. The resilient member 48 is positioned intermediate the front stepped portion of the arm 401a and the battery stepped portion 23. The second opposing end portion 401b is configured with a linearly extending stepped portion 403 which is configured to be received (slide) into a mating housing portion 11e. The front spring 402 is positioned in the housing at the second end of the arm to "spring-load" the latch 400. In operation, the piezo-ceramic member 30 moves or displaces the battery from its non-driven (static) position. The battery stepped portion 23 presses against the resilient member 48 and the latch arm 401 which is held in location against the housing body 11. (The latch arm 401 is also floating and can move forward or rearward relative to the front spring 408). The spring loaded mounting configuration of the battery 20 relative to the housing 11 facilitates the abutting contact in both directions as well as the rapid back and forth movement of the battery 20 (vibration motion relative to the housing) corresponding to the movement of the piezo-ceramic member 30.

Figure 5:
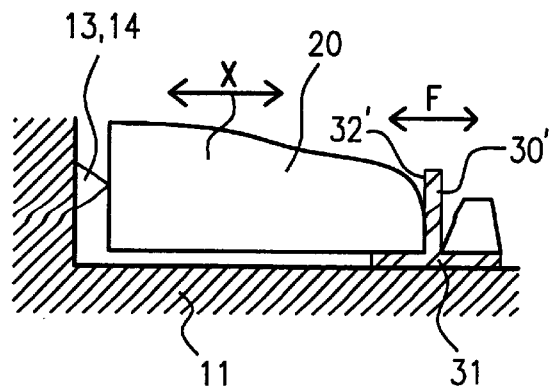
FIG. 5 is a schematic side view of an upwardly extending cantilevered piezo-ceramic member mounted perpendicular to a major surface of the battery to deflect and force the battery to displace a distance along the axis direction marked as "x".

FIG. 5 illustrates an additional mounting configuration for the piezo-ceramic member 30' according to the present invention. As shown, the piezo-ceramic member 30' is oriented such that the length of the member extends perpendicular to the direction of translation of the deflection and thus, translation of the battery 20. The piezo-ceramic member 30' is shown in a cantilevered mounting position (fixed to the housing at one end) but other mounting configurations can also be employed.

Figure 6D:
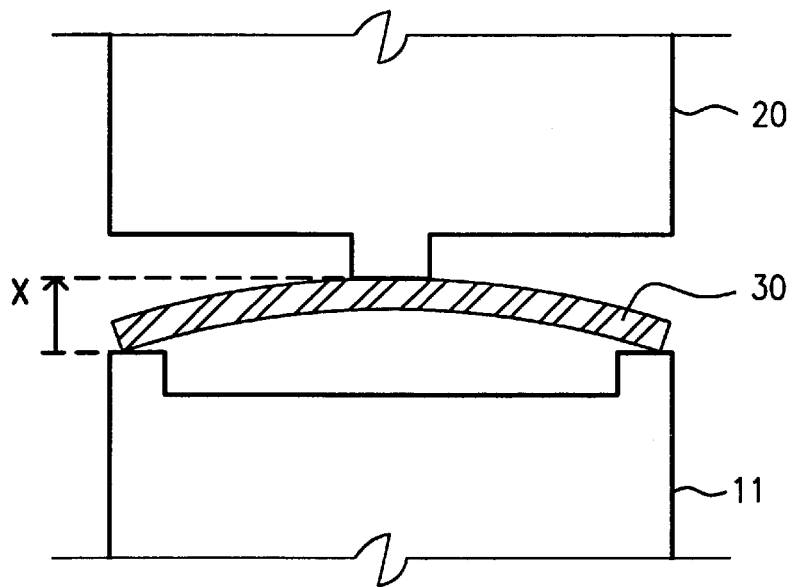

FIGS. 6A, 6B, 6C, and 6D schematically illustrate a single layer piezo-ceramic member 30 configured to increase bending displacement. As shown in FIG. 6B, during operation the piezo-ceramic 30 is mounted to have a center 30c and two end contacts 30a, 30b and to deflect a distance "x". Similarly, as shown in FIG. 6D, the piezo-ceramic member 30 deflects (in the other direction) a distance "x". Thus, the moveable member (such as the battery 20) can be displaced a distance "x" in each direction for a total displacement of "2x" for a frequency ($f=f_0$). As used herein, "f" is the frequency and "$f_0$" is the natural or primary frequency.

Figure 7A:
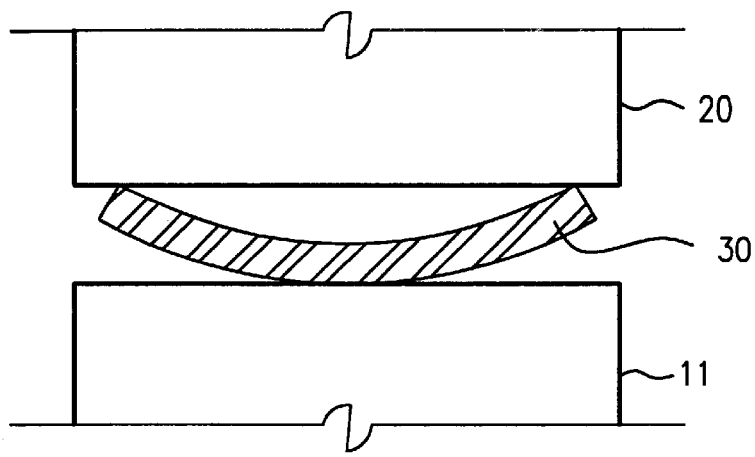
FIGS. 7A, 7B, and 7C are schematic illustrations of a single layer element which is clamped between "solid" blocks (continuous perimeter contact surface). As shown, during operation, the displacement is at a frequency ($f=2f_0$) and the total displacement is a distance "x" (about half the displacement provided by the configuration shown in FIGS. 6A–6D).
Figure 7B:
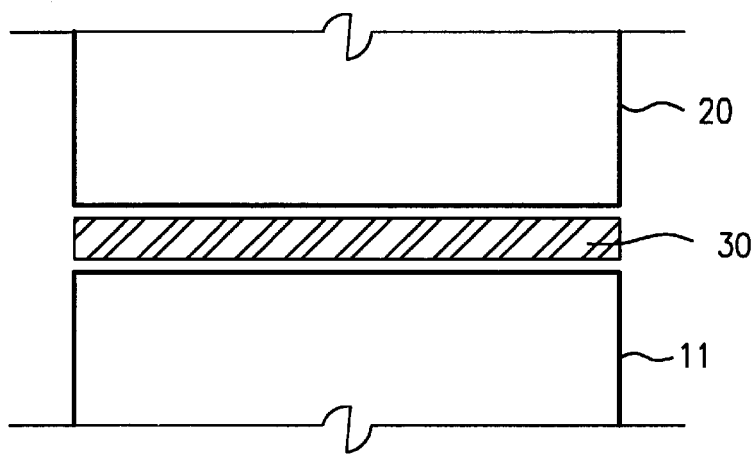
Figure 7C:
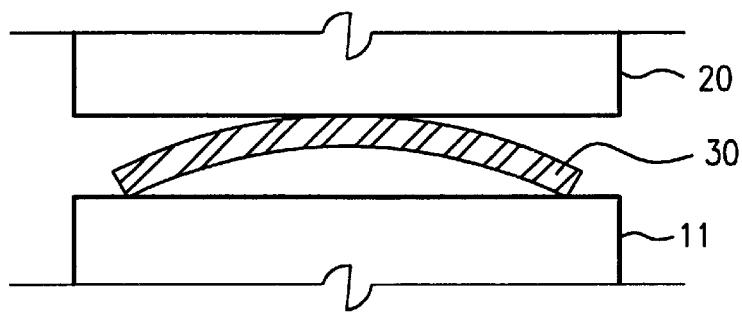

FIGS. 7A, 7B, and 7C schematically illustrate a single layer piezo-ceramic member 30 which is clamped between two opposing "solid" blocks (each of the opposing components or blocks provides a continuous perimeter contact surface). As shown, during operation, the displacement is at a frequency ($f=2f_0$) and the total displacement is a distance "x" (about half the displacement provided by the configuration shown in FIGS. 6A–6D). Generally stated, this reduced displacement is attributed to mechanical confinement of the driving wave (ie., about half of the driving wave is inverted due to the mechanical confinement).

Figure 18A:
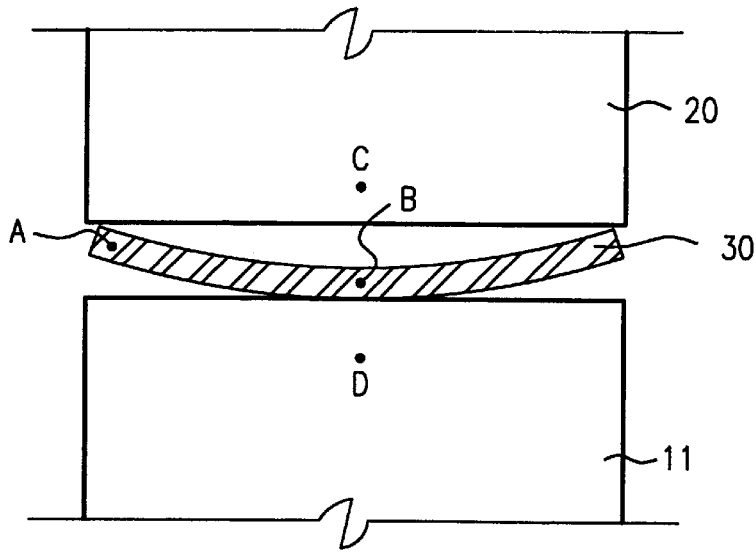
FIGS. 18A, 18B, and 18C illustrate the driving waveform and relative displacements of points A and B on a piezo-ceramic member, point C on a moveable mass and point D on a stationary member or housing.
Figure 18B:
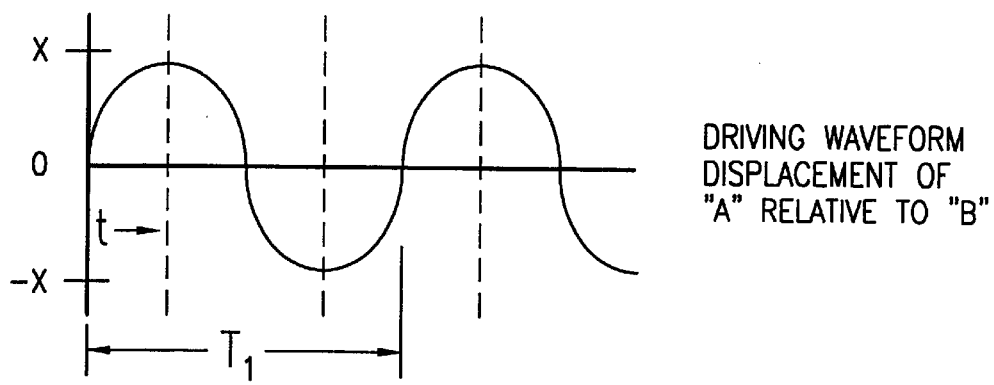
Figure 18C:
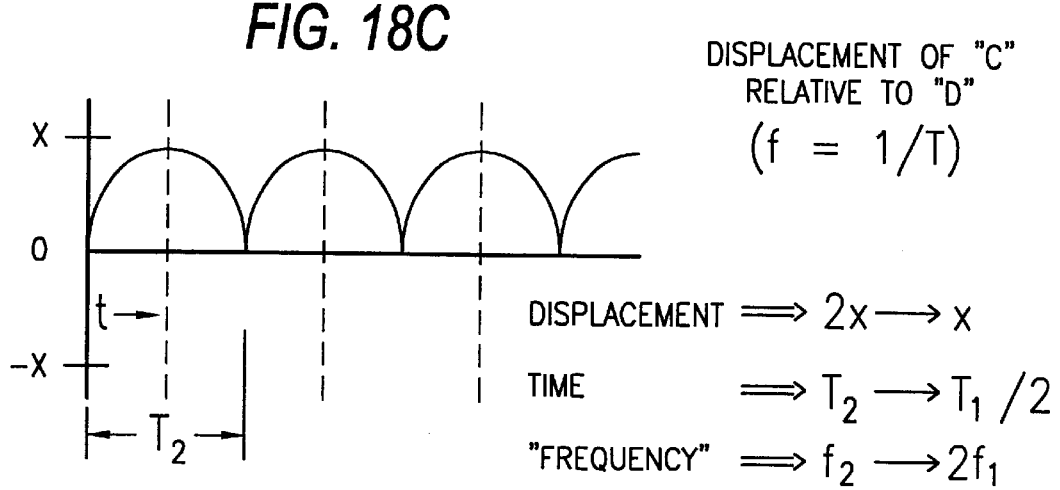

FIGS. 18A, 18B, and 18C illustrate the driving waveform and relative displacements of points A and B on the piezo-ceramic member 30, point C on the battery and point D (on the housing 11). FIG. 18B graphically illustrates the amplitude of the driving waveform over time (distance "x" vs. time "t") for a displacement of point A relative to point B on the piezo-ceramic member 30. FIG. 18C graphically illustrates the displacement of point C on the battery 20 relative to point D on the housing 11. As shown in FIG. 18C, the response period $T_2$ is about half of the value of $T_1$ and the frequency $f_2$ ($1/T_1$) is $2f_1$. Thus, as shown, the displacement of the battery (point C) is "x" versus a driving wave displacement of 2x (point A relative to point B).

Figure 8A:
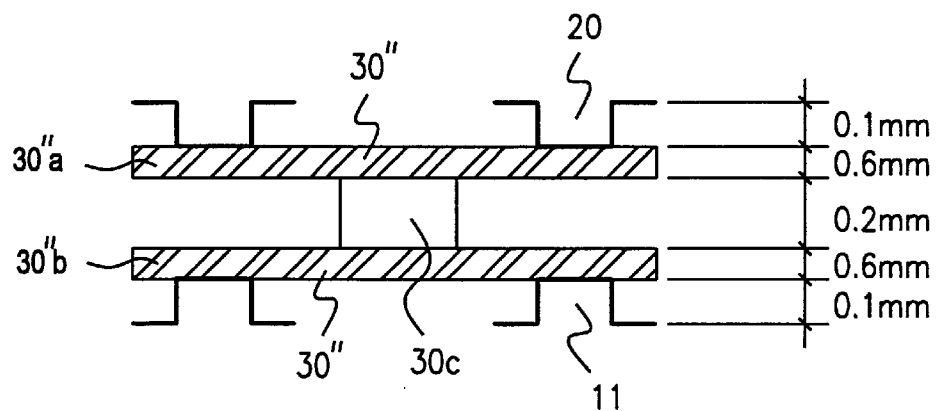
FIGS. 8A, 8B, 8C, and 8D are schematic illustrations of the operational deflection of a double element piezo-ceramic member positioned with an intermediately positioned metal conductor.
Figure 8B:
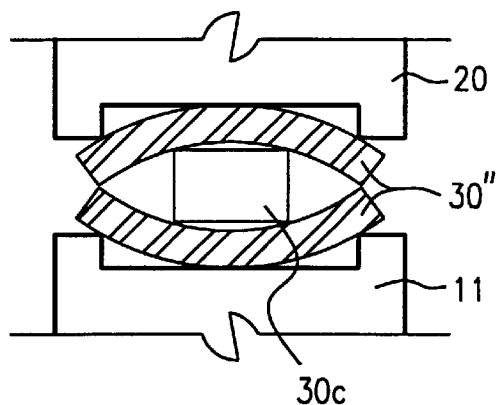
Figure 8C:
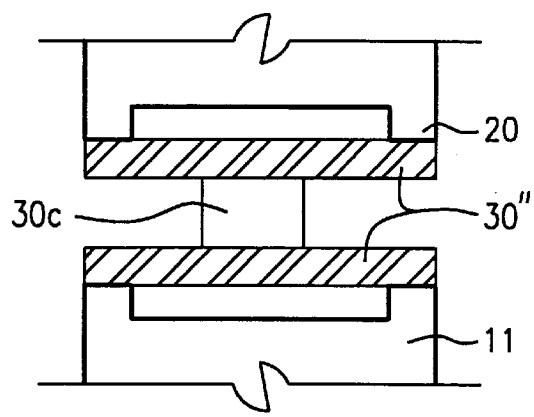
Figure 8D:
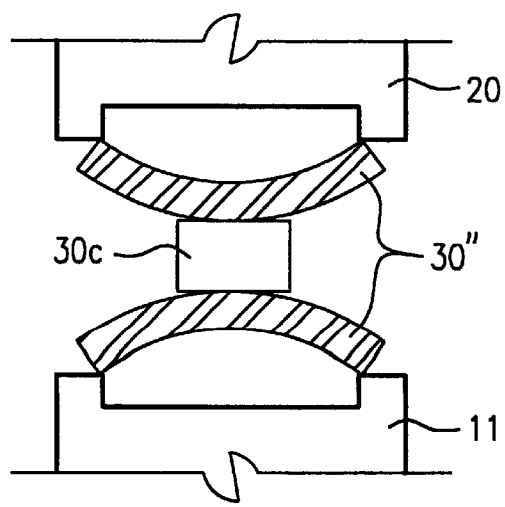

FIGS. 8A, 8B, 8C, and 8D schematically illustrate the operational deflection of a double element piezo-ceramic member 30" positioned with an intermediately positioned metal conductor 30c. The intermediately positioned metal conductor 30c is preferably formed from a conductive elastomeric material and is sized and configured to provide the active drive signal electrical inputs for each of the double elements 30". Preferably, the same drive circuit is used to drive each element 30"a, 30"b in series (such that about twice the current or voltage is output from the drive circuit compared to a single element piezo-ceramic configuration). FIGS. 8A and 8C illustrate the non-driven position or configuration while FIGS. 8B and 8D illustrate the deflection of the piezo-ceramic elements 30" in response to the electrical driver input. Typically material thicknesses for each element 30a", 30b" are about 0.6 mm while the center conductor 30c has a thickness of about 0.2 mm.

The level of vibration or "shake" output by the radiotelephone 10 from the vibrator is related to the acceleration at which the radiotelephone is moved. As such, the amount of vibration corresponds to the peizo-ceramic member 30 deflection frequency, battery mass, and the battery translation distance or displacement. The displacement of the telephone is preferably about at least 30–60 micrometers. The battery is preferably driven and configured to move about three times the preferred displacement of the telephone. That is, for a battery mass of about 20 grams on a telephone weighing about 60 grams (without the battery), translated at a frequency of about 30–300 Hz, the battery preferably moves a translation distance "x" which corresponds to about three times the above stated 30–60 micrometers, the desired displacement of the telephone, or 90–180 micrometers. Typically, human perception of vibration can be reduced at a frequency of above about 200 Hz. Of course, the preferred displacement of the translatable member will vary corresponding to the weight of the device as it relates to the weight of the member.

In preferred embodiments, the piezo-ceramic member 30 and battery 20 are configured to provide a forward movement "x" and a rearward movement "−x", thus giving a total absolute value displacement or translation of "2x" (or 2y or 2z, depending on the orientation of deflection or mounting configuration employed).

Advantageously, in preferred embodiments, the instant invention is configured to use a piezo-ceramic member 30 to displace or translate the battery 20 and/or other integral masses associated with selected components or hardware having other functions within the radiotelephone assembly to generate the vibration desired for the radiotelephone vibrator mode. Other embodiments will be discussed further below. This vibrator configuration for the radiotelephone which employs integral mass configuration can eliminate the need for conventional motor-driven vibrators or eccentric weights. Advantageously, the miniature size of the piezo-ceramic member 30 and the mass of the battery 20 is sufficient to provide a user detectable vibration when the radiotelephone is positioned adjacent the user's body. Preferably, the vibrator configuration provides at least about 30 micrometers of "shake" for the radiotelephone.

Suitable piezo-ceramic materials and elements are available from EDO Corporation, Salt Lake City, Utah. Generally described, piezo-ceramic materials can produce motion by receiving electric potential across their polarized surfaces. See Mostafa Hedayatnia, Smart Materials for Silent Alarms, Mechanical Engineering, http://www.memagazine.org/contents/current/features/alarms. html (© 1998 ASME). Of course other piezo-electric materials can also be employed as long as they have sufficient structural rigidity to impart a contact force which can move an adjacently positioned component (having an appropriately weighted mass) a sufficient distance so as to provide a vibration motion for the device. In a preferred embodiment, the piezo-ceramic member 30 is formed as a compact lightweight package having a substantially planar beam or blade-like configuration. Typical dimensions are about 2 mm or less (thickness)×5 mm (width)×10 mm (length). Preferred dimensions are on the order of about 10 mm (width)×30 mm (length)×0.6 mm (thickness). Thicknesses larger than about 1 mm may inhibit large deflections.

The preferred embodiments discussed above describe translating the battery 20 to produce the vibrating motion for the radiotelephone 10. However, the piezo-ceramic member 30 can be used to translate or displace (selected) other appropriately weighted components associated with a radiotelephone 10. For example, a portion of the housing or casing itself (e.g., the front casing or the back casing), a flip or cover, a clip, a printed circuit board, or an antenna.

Figure 9A:
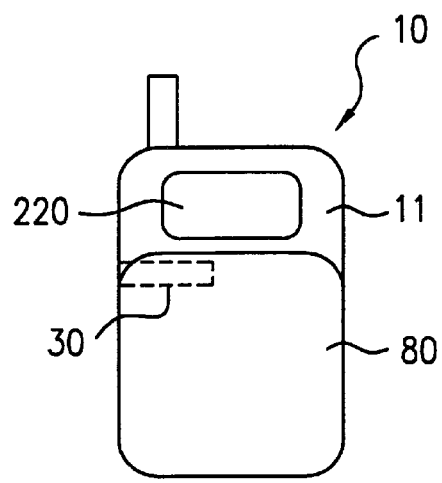
FIG. 9A is a front view of a radiotelephone illustrating an alternate embodiment of the present invention. As shown, a piezo-ceramic vibrator for a radiotelephone is configured and mounted to use the flip as a selected translatable component to generate a vibrating motion.
Figure 9B:
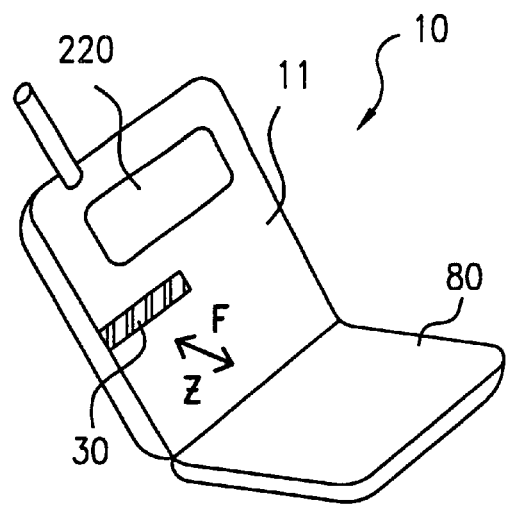
FIG. 9B is a perspective view of the radiotelephone of FIG. 9A showing the flip open to better view the position of the piezo-ceramic member.
Figure 10A:
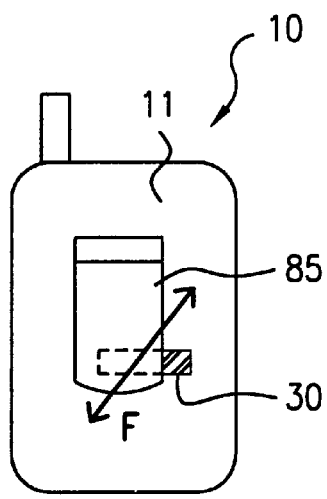
FIG. 10A is a rear view of a radiotelephone of yet another embodiment of the present invention showing a piezo-ceramic member mounted to use the clip as the translatable component used to generate a vibrating motion.
Figure 10B:
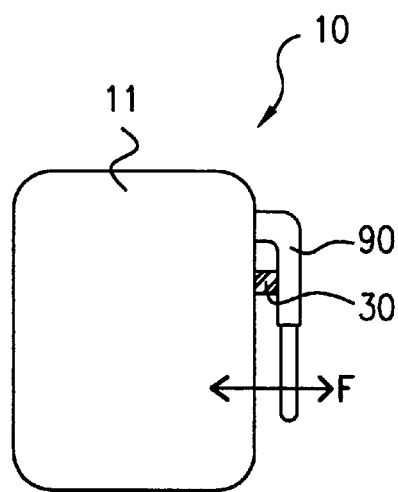
FIG. 10B is a front view of a radiotelephone of an additional embodiment of the present invention showing a piezo-ceramic member mounted to use an antenna as the translatable component used to generate a vibrating motion.

FIGS. 9A, 10, and 10B illustrate preferred embodiments of alternate translatable masses within the radiotelephone 10. FIGS. 9A and 9B show the piezo-ceramic member 30 positioned such that it contacts the cover 80 (preferably directly) when the cover is in the closed position (i.e., stored adjacent the face of the radiotelephone 10). FIG. 9A illustrates the flip 80 in a closed or stow position, while FIG. 9B shows the flip in an open position. In operation, the piezo-ceramic member 30 deflects in a "z" direction which extends in and out of the paper as shown in FIG. 9B. Preferably, the portion of the flip 80 contacting the piezo-ceramic member 30 is tightly mounted to the body of the radiotelephone such that it is held in a spring-loaded manner against the piezo-ceramic member 30 so that it follows the back and forth deflection movement of the piezo-ceramic member 30 creating the vibrating output. FIG. 10A illustrates the piezo-ceramic member 30 positioned on the radiotelephone 10 such that it deflects against and displaces or translates a (pocket) clip 85. FIG. 10B illustrates the piezo-ceramic member 30 is positioned on the radiotelephone 10 such that it deflects against a stowed antenna 90. Advantageously, the (pivot or hinged antenna 90 and clip 85 typically float or are resiliently mounted against the radiotelephone 10 such that these components substantially follow the inward and outward deflection of the piezo-ceramic member 30. Further, the clip and hinged antenna 85, 90 are assembled to the housing such that each is spring-loaded or biased toward a stowed position adjacent the body of the radiotelephone to easily allow the repeated reciprocal movement of the clip 85 and antenna 90 in response to the repeated deflection of a proximately positioned piezo-ceramic member 30. As noted above, it is preferred that the component selected to translate in response to the piezo-ceramic member 30 have a mass which is at least about 10% of the mass of the radiotelephone, and more preferably at least about 20% of the mass of the radiotelephone, and still more preferably at least about 25% of the mass of the radiotelephone.

Figure 12:
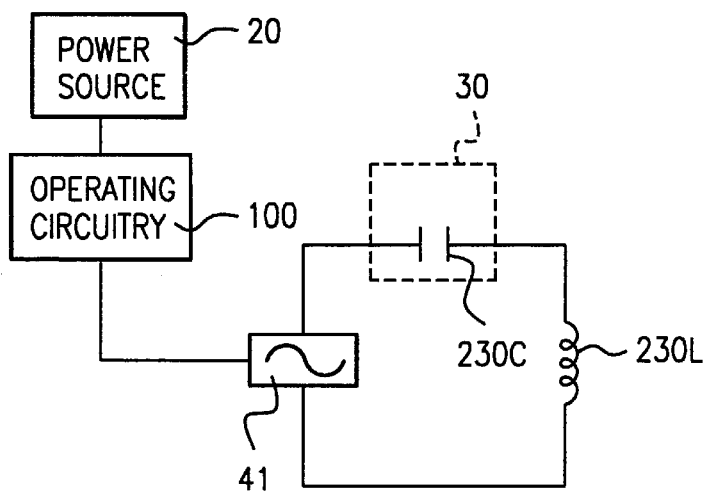
FIG. 12 is a schematic diagram of an alternate electric operating circuit for driving a piezo-ceramic vibrator according to the present invention.

FIG. 12 illustrates an electrical operating circuit for driving the piezo-ceramic member 30. As shown, the radiotelephone operating circuitry 100 is powered by a battery power source 20. The operating circuitry 100 is connected to an inverter 41. The piezo-ceramic member 30 (shown in dotted line) can be modeled as a capacitor 230c which is successively charged and discharged to produce the driver output. As shown, the electric circuit also includes an inductor 230L. Of course, other driver or optimization circuit components can also be employed as will be appreciated by one of skill in the art.

Figure 11A:
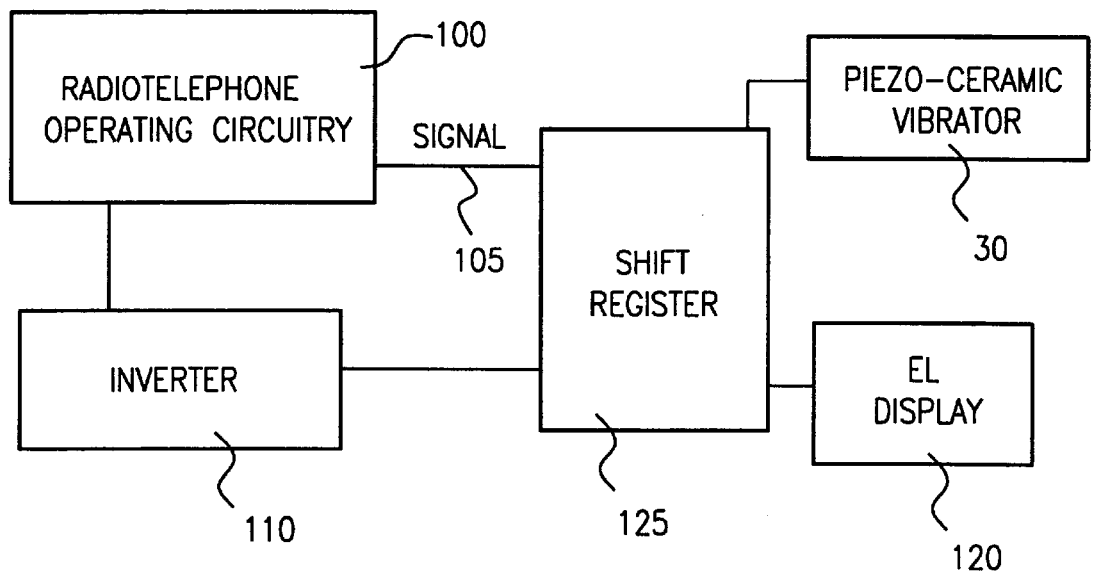
FIG. 11A is a schematic diagram of an electric operating circuit for driving the piezo-ceramic vibrator according to the present invention.

FIG. 11A schematically illustrates operational components or an electrical circuit for a radiotelephone according to a preferred embodiment of the present invention. In this embodiment, the radiotelephone 10 includes an electroluminescent ("EL") display 120 which can be used to backlight the display designated at 220 in FIG. 9A and/or keypad entry. Preferably, for this embodiment, the same inverter 150 (FIG. 1B) is used to drive both the piezo-ceramic member 30 and the EL display 120.

Figure 11B:
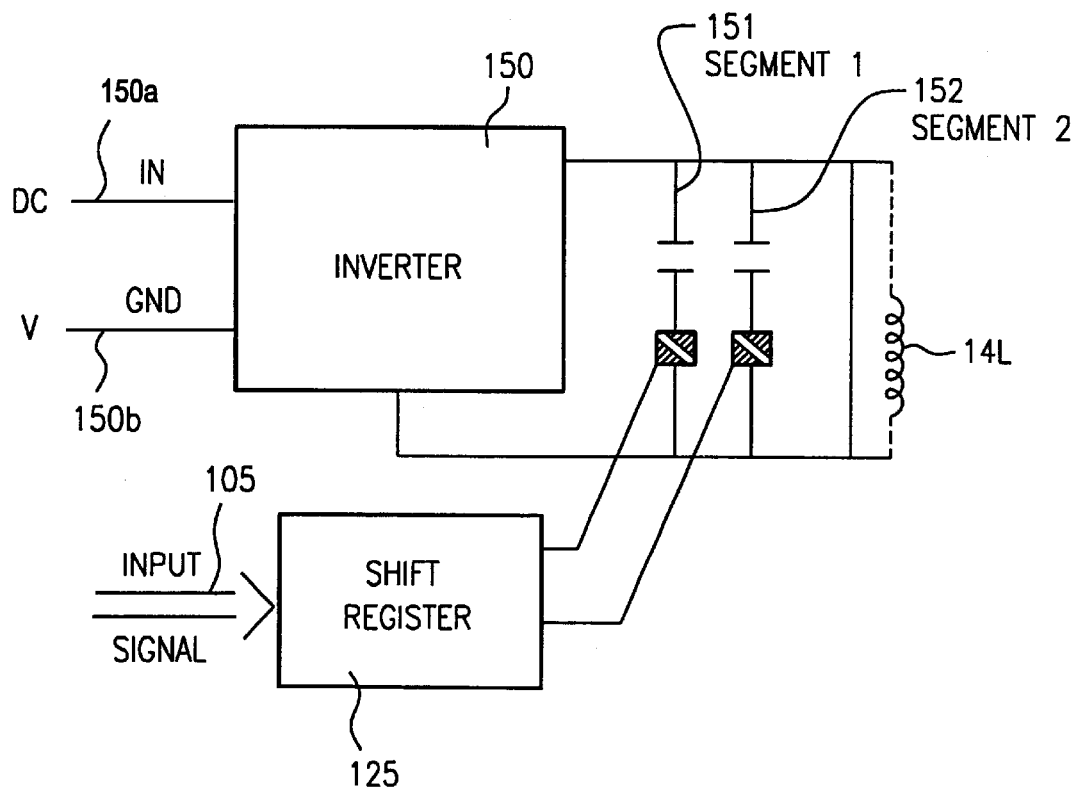
FIG. 11B is a schematic diagram of a dual drive circuit for the circuit shown in FIG. 11A.

Generally described, and as shown in FIG. 11A, the radiotelephone operating circuitry 100 is operably associated with an inverter used to light the EL 110. The radiotelephone operating circuitry 100 directs a signal 105 into a shift register 125 which then directs the signal to the piezo-ceramic member 30 or the EL display 120. As shown in FIG. 11B, an inverter 150 is operably associated with a DC voltage power source and ground input 150a, 150b. The inverter takes the DC voltage and converts it to an AC driving signal. The input signal 105 is fed through a shift register 125 which is electrically connected to two segments 151, 152 of the inverter 150. In this embodiment, the piezo-ceramic member 30 and associated translatable component (such as the battery 20) are configured to vibrate at a frequency of between about 100–200 Hz. For a vibration frequency of about 200–250 Hz, the EL display can be driven at the low end of the recommended drive frequency (200–400 Hz being typically recommended for a driving frequency with good brightness and long life), thus allowing the same driver to drive both the EL display 120 and the piezo-ceramic member 30. In one embodiment, the inverter 150 is selected such that it accepts external input signals which allows for a variable frequency for the driver. For example, Sipex, Durel, and Ericsson include inverter configurations which provide the external input signal(s). Advantageously, even if the EL and piezo-ceramic member are driven at different frequencies, this variable inverter control will allow the individual frequency adjustment for a single driver embodiment. One suitable dual electroluminescent lamp driver is the SP4480 driver from Sipex Corporation.

Figure 13A:
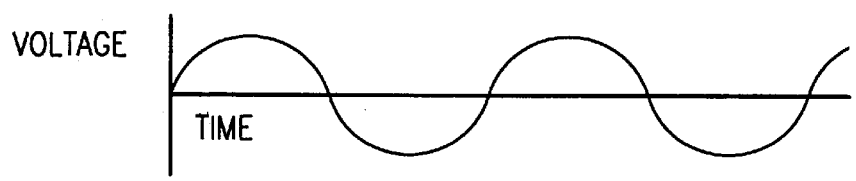
FIGS. 13A, 13B, and 13C are graphs that illustrate preferred driver input pulses or waveforms used to drive a piezo-ceramic vibrator according to the present invention.
Figure 13B:
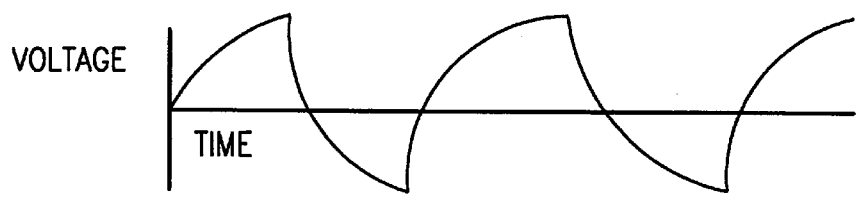
Figure 13C:
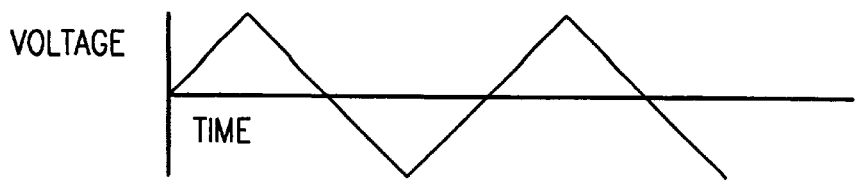

FIGS. 13A, 13B, and 13C illustrate preferred driver input pulses or waveforms. Each of the waveforms can be provided in various frequencies (f). These waveform inputs can induce less noise to the circuit and provide good vibration results across the piezo-ceramic member 30. Typical driving voltages are about 100–200 Vrms (root mean square voltage). Of course, other waveforms such as square waves, ramped waves and the like can also be used.

Figure 14:
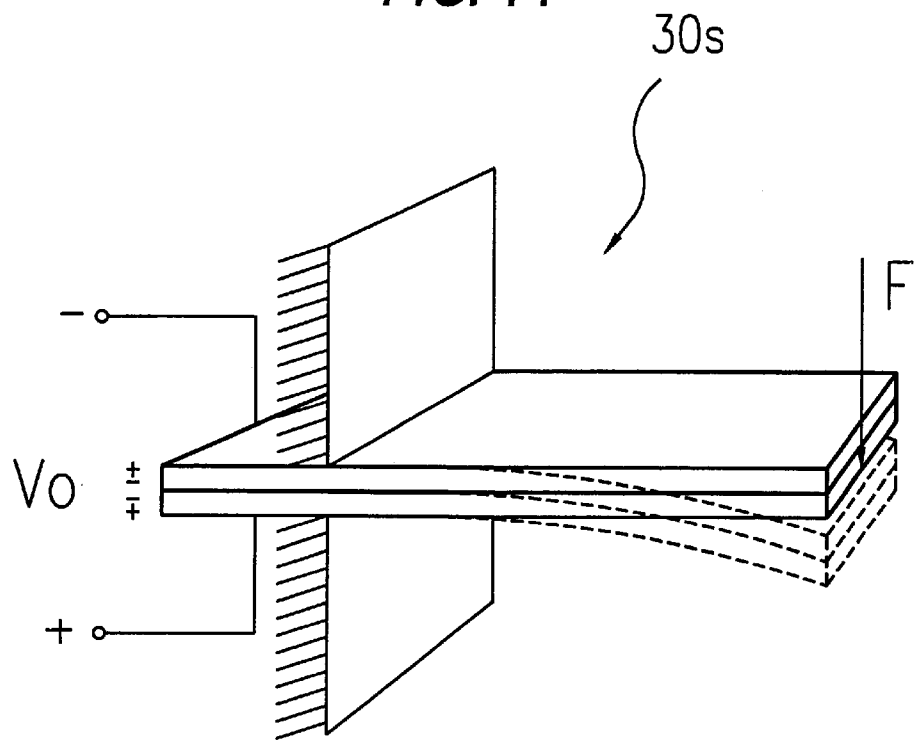
FIG. 14 is a schematic illustration of a series input driven piezo-ceramic vibrator according to the present invention.
Figure 15:
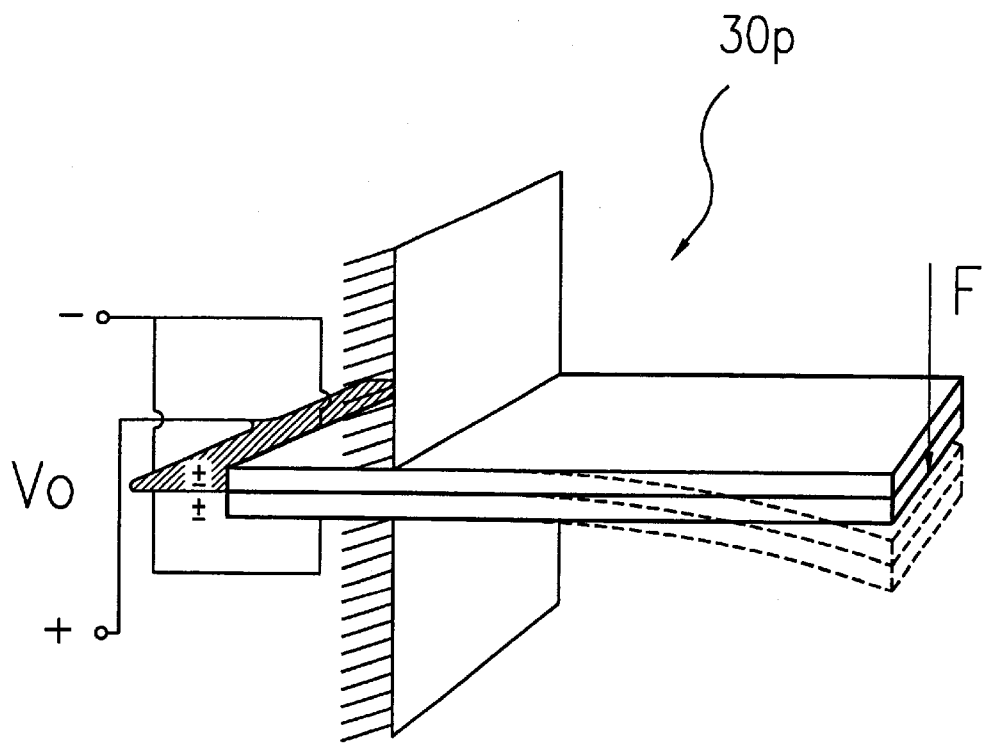
FIG. 15 is a schematic illustration of a parallel input driven piezo-ceramic vibrator according to the present invention.

FIGS. 14 and 15 illustrate electrical interconnections for the piezo-ceramic member 30. FIG. 14 shows a series configuration while FIG. 15 shows a parallel configuration. Applying voltage in the polarity shown results in deflection in the direction shown. Reversing the polarity of the applied voltage causes deflection in the opposite direction.

Figure 16:
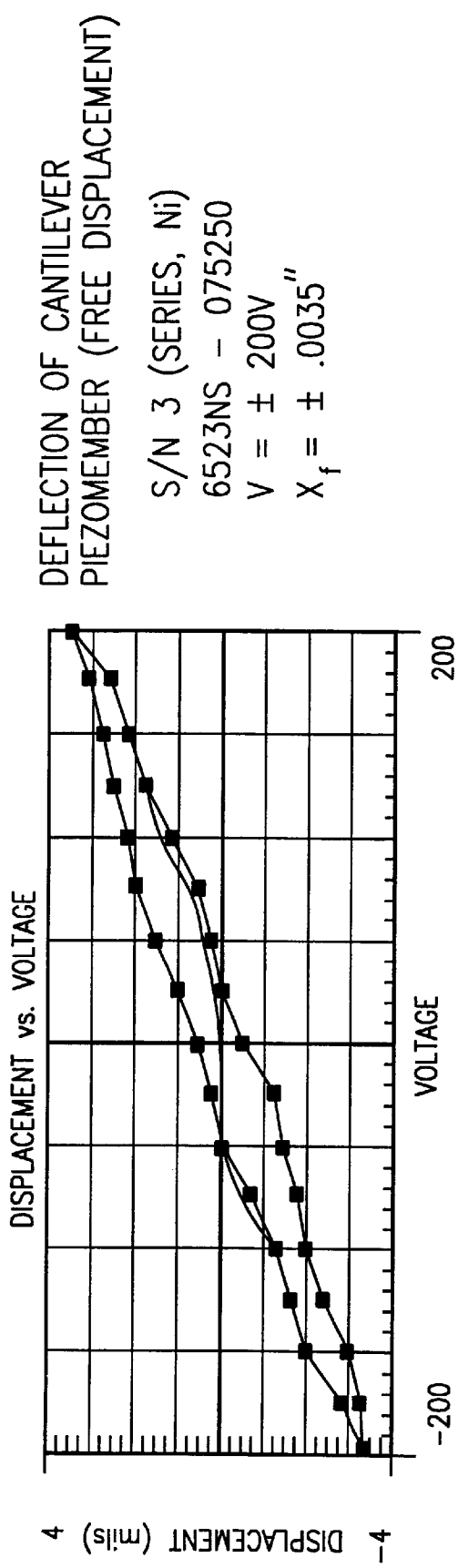
FIG. 16 is a graphic representation of displacement versus voltage for a cantilever mounted, series driven piezo-ceramic member with free displacement. As shown, an input voltage of about 200 V yields a free displacement of about +/−0.0035 inches.

FIG. 16 is a graphic representation of displacement versus voltage for a series driven piezo-ceramic member 30' with a cantilever mounted end showing the free displacement of the non-fixed end. As shown, an input voltage of about 200 V yields a free displacement of about+/−0.0035 inches.

Figure 17:
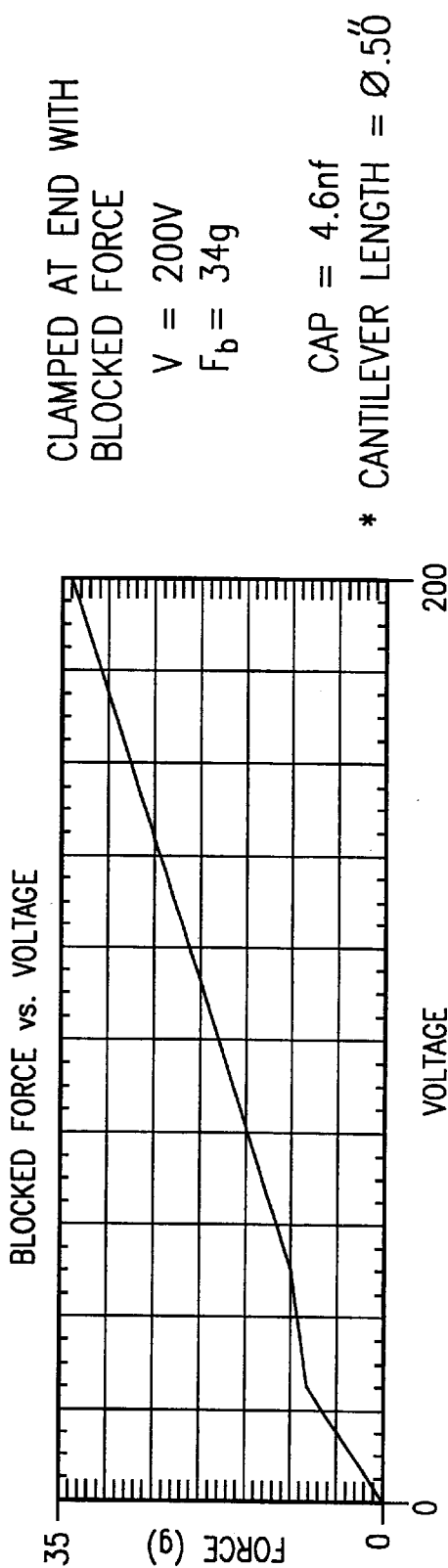
FIG. 17 is a graphic representation of the piezo-ceramic member of FIG. 16, showing blocked force (grams) versus voltage for a cantilever mounted piezo-ceramic member (having about a 4.6 nf capacitance). The cantilevered mounting is such that one end is clamped and the other end extends a distance to provide a cantilever length of about 0.5 inches. As shown, an input voltage of about 200 V will generate a blocked force of about 34 grams.

FIG. 17 is a graphic representation of the piezo-ceramic member of FIG. 16, showing blocked force (grams) versus voltage for a cantilever mounted piezo-ceramic member (having about a 4.6 nf capacitance). The cantilevered mounting is such that one end is clamped and the other end extends a distance to provide a cantilever length of about 0.5 inches. The non-fixed end abuts a mass to provide a "blocked force" output. The non-fixed end abuts a fixture with a load cell to provide a "blocked force" output. As shown, an input voltage of about 200 V will generate a blocked force of about 34 grams. The piezo-ceramic member used for each of these tests was a series nickel type component identified by part number 6523NS-075250 from EDO Corporation, Salt Lake City, Utah.

Although the piezo-ceramic vibrator 30 has been described above in conjunction with radiotelephones, it will be appreciated by one of skill in the art, that the instant invention is not limited thereto and can also be used with other wireless devices such personal computer systems (PCS), notebook computers, and the like. Further, it will be appreciated that the term "displace" or "translate" is not limited to linear translations. Accordingly, as used herein the term "translate" includes any displacement or movement of the selected component such as by pivotal, linear, or non-linear movements. Stated differently, the term translate includes any movement or displacement sufficient to render a vibratory motion when repeated (such as reciprocal or oscillatory movement) at a selected frequency.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of providing a silent alert for a radiotelephone, the radiotelephone having a flip or cover, a rotational antenna, a clip, and front and back housing members, comprising the steps of:

mounting a piezo-ceramic member so that at least one end is fixed to a stationary portion of the radiotelephone;

mounting a selected radiotelephone component to the radiotelephone so that it is free to undergo repetitive movement in response to contact with the piezo-ceramic member;

deflecting the piezo-ceramic member from a non-electrically driven position to an electrically driven position;

contacting the selected component with the deflected piezo-ceramic member; and repeatedly moving said selected component a distance in a first direction and a distance in a second direction substantially opposite the first direction, said translating step corresponding to said deflecting and contacting steps, wherein the selected component has a mass which is sufficiently large with respect to the overall mass of the radiotelephone to generate a user detectable vibration due to translation thereof.

2. A method according to claim 1, wherein the selected component is one or more of the flip, cover, clip, antenna, battery, front, and back housing.

3. A method according to claim 2, wherein the piezo-ceramic member is electrically driven by a repeating series of electrical waveforms.

4. A method according to claim 3, wherein the selected component has a mass which is greater than or equal to 10% of the total mass of the radiotelephone.

5. A radiotelephone, comprising:
a radiotelephone housing;
a battery resiliently mounted to said radiotelephone housing such that the battery is able to float relative to the housing and translate toward and away from a portion of the housing so that it is free to undergo repetitive movement relative thereto; and
a non-rotational vibrator operably associated with said battery; wherein, in operation, said vibrator deflects in a first direction and a second direction substantially opposite to the first direction, and wherein said battery undergoes repetitive movement relative to said radiotelephone housing and translates independent of said housing responsive to the deflection of said vibrator, thereby providing a vibrating sensation for said radiotelephone.

6. A radiotelephone according to claim 5, wherein said vibrator source is a piezo-ceramic vibrator.

7. A radiotelephone according to claim 6, wherein said radiotelephone includes at least one spring-loaded battery contact, and wherein said battery repetitively oscillates toward and away from said spring-loaded contact in response to operation of said non-rotational piezo-ceramic vibrator.

8. A radiotelephone according to claim 7, wherein said piezo-ceramic vibrator has a substantially planar blade configuration with major surfaces, and wherein said piezo-ceramic vibrator is mounted in said radiotelephone such that the major surfaces of said piezo-ceramic member are oriented to be in a direction which is substantially perpendicular to the direction of translation of said battery.

9. A radiotelephone according to claim 5, said radiotelephone further comprising an electronic driver source operably associated with said piezo-ceramic vibrator, wherein said electronic driver source drives said piezo-ceramic vibrator with a successive series of waveforms.

10. A radiotelephone according to claim 9, wherein said radiotelephone further comprises an electro-luminescence source, and wherein said electronic driver is operably associated with both said electro-luminescence source and said piezo-ceramic vibrator.

11. A radiotelephone according to claim 5, wherein said housing has a pair of opposing sidewalls and at least one lateral wall extending therebetween to define a battery receptacle with a floor, wherein said radiotelephone further comprises a plurality of spaced apart resilient battery contacts, and wherein said battery is sized and configured to reside in said battery channel so that it rests against said floor and floats in a direction which is toward said floor or toward said lateral wall so as to be in contact with said resilient battery contacts, and wherein said battery repetitively slides so as to oscillate toward and away from said contacts in response to deflection of said piezo-ceramic vibrator, wherein said piezo-ceramic member has a substantially planar blade configuration with major surfaces, and wherein said piezo-ceramic vibrator is mounted to said radiotelephone such that the major surfaces of said piezo-ceramic vibrator are oriented in a direction which is substantially parallel to the direction of translation of said battery.

12. A radiotelephone according to claim 5, wherein said battery has a weight which is greater than or equal to 10% of the total weight of said radiotelephone.

13. A radiotelephone according to claim 5, wherein said housing includes two opposing sidewalls and a lateral wall extending therebetween defining a battery channel with a floor, wherein said radiotelephone includes a plurality of resilient battery contacts located in said battery channel, and wherein said battery is sized and configured to reside in said battery channel so that it rests against the floor and floats in the direction of said lateral wall so as to be in contact with said resilient battery contacts, and wherein said battery repetitively slides so as to oscillate toward and away from said contacts on said lateral wall in response to deflection of said piezo-ceramic vibrator.

14. A radiotelephone according to claim 13, wherein said piezo-ceramic vibrator has opposing ends and an intermediate section therebetween, wherein both ends of said piezo-ceramic vibrator are affixed to said radiotelephone housing and said intermediate section deflects in response to an electric input to said piezo-ceramic vibrator, and wherein said battery channel includes at least one low friction surface so as to facilitate a sliding movement of said battery toward and away from said lateral wall.

15. A wireless communication device, comprising:
a wireless communication device housing;
an assembly component having a predetermined mass mounted to said wireless communication device housing such that it is able to float in a predetermined travel path so that it is free to undergo repeated movement relative to said device housing; and
a non-rotational piezo-ceramic member operably associated with said component and held in said device housing so as to be unattached to and able to move away and toward said assembly component, wherein in operation, said piezo-ceramic member deflects in a first direction and a second direction opposite to said first direction, and wherein said selected component translates relative to said wireless communication device housing such that said selected component travels in the predetermined travel path toward and away from one of a primary or minor surface of the housing responsive to the repeated deflection of said piezo-ceramic member thereby providing a vibrating sensation for said wireless communication device.

16. A wireless communication device according to claim 15, wherein said wireless communication device housing includes two opposing sidewalls and a lateral wall defining a battery channel with a floor therebetween, wherein said wireless communication device includes a plurality of battery contacts located in said battery channel, and wherein said selected component is a battery which is sized and configured to reside captured in said battery channel so as to be translate in a pivotal manner toward and away from said battery channel floor about said battery contacts.

17. A wireless communication device according to claim 16, wherein said piezo-ceramic member has a substantially planar blade configuration with opposing primary surfaces, and wherein said piezo-ceramic member is mounted in said wireless communication device such that said primary surfaces are oriented in a direction which is substantially parallel to the direction of translation of said selected component.

18. A wireless communication device according to claim 16, wherein said component has a weight which is greater than or equal to 10% of the total weight of said wireless communication device.

19. A wireless communication device according to claim 16, wherein said piezo-ceramic member has opposing ends, and wherein one end of said piezo-ceramic member is affixed to said wireless communication device housing to define a cantilevered piezo-ceramic member.

20. A wireless communication device according to claim 16, wherein said piezo-ceramic member has opposing ends and an intermediate section therebetween, wherein both ends of said piezo-ceramic member are affixed to said wireless communication device housing and said intermediate section deflects in response to an electric input to said piezo-ceramic member.

21. A wireless communication device according to claim 15, said wireless communication device further comprising a flip, an antenna, a clip, front housing, back housing, battery, and printed circuit board, wherein said assembly component is at least one of same.

22. A wireless communication device according to claim 15, wherein said piezo-ceramic member is operably associated with an electronic driver source which drives said piezo-ceramic member with a series of electrical waveforms.

23. A wireless communication device according to claim 22, wherein said device further comprises an inverter and an electro-luminescence source, and wherein said inverter is operably associated with both said electro-luminescence source and said piezo-ceramic member.

24. A wireless communication device according to claim 15, wherein said wireless communication device housing includes two opposing sidewalls and a lateral wall defining a battery channel with a floor therebetween, wherein said wireless communication device includes a plurality of resilient battery contacts located in said battery channel, and wherein said selected component is a battery which is sized and configured to reside in said battery channel so that it rests against the floor and floats in the direction of said lateral wall so as to be in contact with said resilient battery contacts, and wherein said battery repetitively slides so as to oscillate towards and away from said contacts in response to deflection of said piezo-ceramic member.

25. A wireless communication device according to claim 24, wherein said battery channel floor includes a low friction sliding surface, wherein, in operation, said battery slides over said low friction sliding surface, wherein said piezo-ceramic member has a substantially planar blade configuration, with opposing primary surfaces and wherein said piezo-ceramic member is mounted in said wireless communication device such that its primary surfaces are oriented in a deflection direction which is substantially perpendicular to the direction of translation of said battery.

26. A method of providing an alert for a wireless communications device, the wireless communications device having a flip or cover, a rotational antenna, a clip, a battery and front and back housing members, comprising the steps of:

mounting a piezo-ceramic member so that at least one end is fixed to a stationary portion of the wireless communications device;

mounting a selected wireless communications device component to the wireless communications device so that it is proximate to but unattached to the piezo-ceramic member so that it is free to undergo repetitive movement in response to contact with the piezo-ceramic member;

deflecting the piezo-ceramic member from a non-electrically driven position to an electrically driven position;

contacting the selected component with the deflected piezo-ceramic member; and repeatedly moving said selected component a distance in a first direction and a distance in a second direction substantially opposite to the first direction, said moving step corresponding to said deflecting and contacting steps, wherein the selected component has a mass which is sufficiently large with respect to the overall mass of the wireless communications device to generate a user detectable vibration due to translation thereof.

27. A method according to claim 26, wherein the selected component is a battery, and wherein said moving step comprises sliding the battery.

28. A method according to claim 27, wherein said wireless communication device includes a plurality of spaced apart resilient battery contacts, and wherein the battery slides over a low friction slide surface to repetitively oscillate toward and away from the contacts in response to deflection of the piezo-ceramic member.

29. A method according to claim 26, wherein said selected component is a non-cylindrical battery which powers the operation of the radiotelephone, and wherein said moving step comprises repetitively forcing the battery away from a static resting position and then allowing it to return thereto while providing power to the radiotelephone.

30. A method according to claim 26, wherein the selected component is one or more of the flip, cover, clip, antenna, battery, front, and back housing.

31. A method according to claim 30, wherein the piezo-ceramic member is electrically driven by a repeating series of electrical waveforms.

32. A method according to claim 31, wherein the selected component has a mass which is greater than or equal to 10% of the mass of the wireless communication device, and wherein the selected component is directly contacted by the deflected piezo-ceramic member.

* * * * *